William Blockinger
INVENTOR.

Patented Jan. 15, 1952

2,582,619

UNITED STATES PATENT OFFICE 2,582,619

FISHING BOBBER

William Blockinger, West St. Paul, Minn.

Application May 10, 1948, Serial No. 26,142

1 Claim. (Cl. 43—44.9)

This invention relates to new and useful improvements in fishing bobbers and the primary object of the present invention is to provide a buoyant body and novel and improved means carried by said body for engaging and slidably guiding a fishing line whereby the bobber or body may move longitudinally on the line or whereby the said line may be moved relative to the body.

Another object of the present invention is to provide a buoyant body, a line engaging member carried by said body, and novel and improved means carried by said line engaging members for holding the same relative to the body and preventing splitting of the body.

Another important object of the present invention is to provide a fishing bobber including a buoyant body, a line receiving guide removably carried by said body, and novel and improved means for retaining a line positioned to the guide so that the same will not disengage the guide or body.

A further object of the present invention is to provide a fishing bobber including a buoyant body, a guide carried by the body and embodying novel and improved means for anchoring the guide relative to the body so that the same may be conveniently fixed thereto or removed therefrom in a desirable manner.

A still further aim of the present invention is to provide a fishing bobber that is small and compact in structure, simple and practical in construction, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
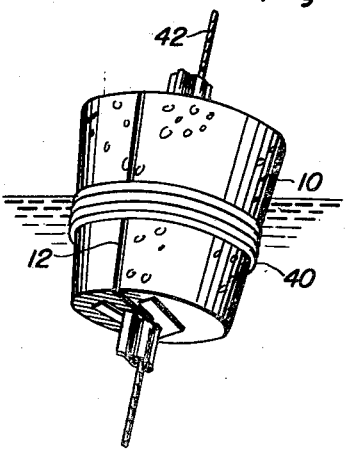
Figure 1 is a perspective view of the present fishing bobber, and showing a line held thereto.
Figure 2:
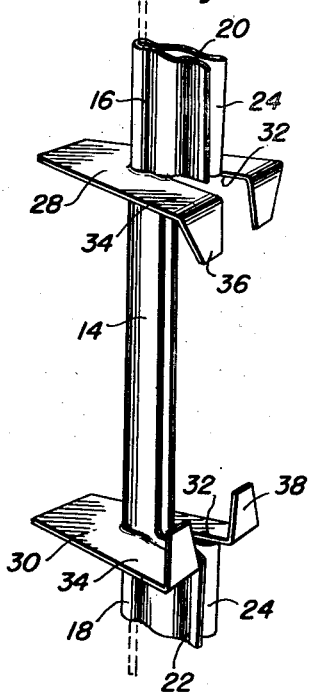
Figure 2 is a perspective view of the fishing bobber constructed in accordance with the present invention, and showing the buoyant body removed therefrom, and with dotted lines showing the position of a fishing line engaged by the guide element.
Figure 3:
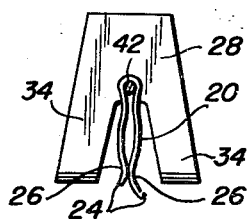
Figure 3 is a top plan view of Figure 1, and showing a fishing line engaged by the guide member.

Referring now to the drawings in detail, and more particularly to Figures 1-3 inclusive, wherein for the purpose of illustration, there is disclosed a preferred embodiment of the present invention, the numeral 10 represents a substantially frusto-conical body of suitable buoyant material having a longitudinal slot or slit 12 formed therein that terminates at the longitudinal axis of the said body.

Slidably engaging the slot 12, and seated at the innermost extremity of the slot 12 is a channeled guide 14 that communicates with the slot 12.

Integrally formed with the upper end 16 and lower end 18 of the channeled guide 14, is an upper pair of gripping tongues or jaws 20 and a lower pair of gripping tongues or jaws 22 respectively. The outer extremities of the jaws 20 and 22 are flared outwardly as at 24 and provide bearing surfaces 26 that normally engage each other for a purpose which will later be more fully apparent.

Rigidly attached to or forming an integral part of the guide 14, is a pair of spaced face plates or anchoring plates 28 and 30 which respectively engage the upper face and lower face of the buoyant body 10. One end of each of these plates 28 and 30 are bifurcated or slotted as at 32 to provide furcations 34. The outer terminals of the furcations 34 of the upper plate 28 are turned downwardly to provide anchoring prongs 36, and the furcations 34 on the lower plate 30 are turned upwardly to provide further anchoring prongs or tongs 38. It is noted, that the anchoring prongs 36 will extend into the upper end of the body 10 and that the prongs 38 will extend into the lower end of the body 10 to prevent movement of the guide relative to said body.

In practical use of the fishing bobber described in Figures 1-3 inclusive, once the guide 14 has been inserted in the slot 12 a suitable cord 40 is wound about the body 10 to prevent the said body from being disengaged with the guide element 14. A fishing line 42 is extended into the slit 12, preferably prior to the winding of the cord 40 thereabout, and is seated in the guide 14. The gripping tongs 20 and 22 will obviously prevent the cord 42 from disengaging the guide 14, and thus the body 10 may slide upon the line 42 and the line 42 may be pulled through the guide 14 without raising the body 10. Obviously, a suitable stop may be applied to the line 42 to limit the sliding movement of the cord 42 relative to the body 10, in which instance the body 10 may be pulled outwardly from the fluid medium in which the same is floating.

Figure 4:
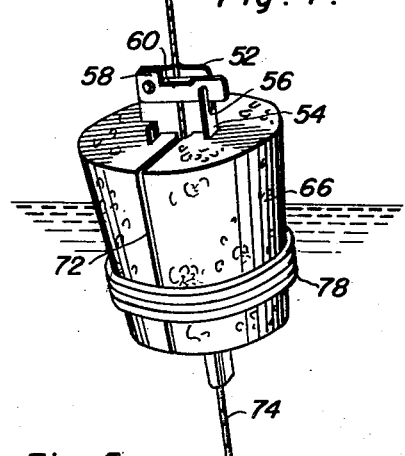
Figure 4 is a perspective view of the present fishing bobber in slightly modified form, and showing a fishing line applied to the guide portion thereof.
Figure 5:
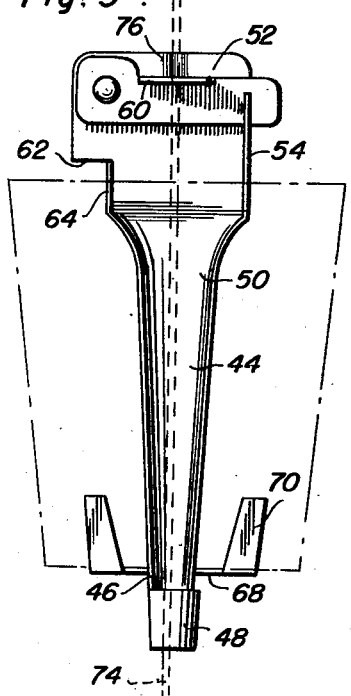
Figure 5 is an elevational view of the fishing bobber in modified form, and showing the buoyant body and fishing line applied thereto in dotted lines.

Reference is now directed to Figures 4 and 5, wherein for the purpose of illustration, there is disclosed the present fishing bobber in slightly modified form. In this embodiment, the numeral 44 represents a substantially channel shaped guide which tapers toward its lower end 46. Integrally formed with one leg of the guide 44, adjacent its lower end 46, is a retaining flange or arcuate extension 48 that closes the lower end of the said guide 44.

The upper enlarged terminal 50 of the guide 44, terminates in a flat substantially rectangular holding plate 52 one edge 54 of which is turned inwardly and is slotted as at 56 to engage a pivotal latch 58 mounted on the plate 52. It is noted, that the latch 58 is provided with an outwardly projecting extension 60 functioning as a finger grip to permit the latch to be raised from engagement with the slot 56 or for pivotal movement of the latch into locking engagement with the slot 56 of the extension 54. One lower corner of the plate 52 is slit transversely as at 62 and turned inwardly to provide a bearing lug 64 that engages the upper face of a substantially frusto-conical, buoyant body 66.

Integrally formed with the guide 44, adjacent the lower end 46 thereof, is an anchor or bearing plate 68 one end of which is notched and turned upwardly to provide a pair of anchoring prongs 70 that engage the lower face of the body 66.

In practical use of the fishing bobber illustrated in Figures 4 and 5, a longitudinal slot or slit 76 is provided in the body 66 and communicates with the channeled guide 44. A fishing line 76 is extended into the slit 76 and is held in the channeled guide 44 by the pivotal latch 58. It should be noted, that the upper portion of plate 52 is depressed to provide a longitudinal guide groove 76 that will receive the line 74 and prevent movement of the same toward or away from the extension 54. Further, it is necessary that the line be extended between the retaining tongue 58 and that leg portion of the guide 44 on which the extremity of the tongue 48 is spaced to facilitate the said fishing line to be extended into the guide 44.

It is also preferred, that in the latest embodiment, a cord or retaining ring 78 be slipped over the lower end of the body 66 and pressed upwardly to prevent a loose connection between the body 66 and the guide 44 and which will also tend to close the opening between the slot 76 thus providing an additional means for retaining the guide relative to the body 66.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A fishing bobber comprising an elongated and compressible buoyant body having an axial bore and a slit communicating with said bore, a channeled U-shaped guide positioned in said bore, and communicating with said slot, means carried by said guide for securing the same to said body, and line retaining means forming a part of the guide and disposed exteriorly of said body, said last mentioned means including a pair of plate-like resilient tongues having longitudinally extending grooves, the walls of which normally engage each other.

WILLIAM BLOCKINGER.

REFERENCES CITED

The following references are of record in the file of this patent:

UNITED STATES PATENTS

| Number | Name | Date |
| --- | --- | --- |
| 763,557 | Hachmann | June 28, 1904 |
| 1,598,577 | Hawkinson | Aug. 31, 1926 |
| 1,652,858 | Hahn | Dec. 13, 1927 |
| 2,077,184 | Rader | Apr. 13, 1937 |
| 2,315,048 | Croft | Mar. 30, 1943 |
| 2,393,070 | Saloun | Jan. 15, 1946 |